United States Patent [19]

Schempf et al.

[11] Patent Number: 5,363,935
[45] Date of Patent: Nov. 15, 1994

[54] RECONFIGURABLE MOBILE VEHICLE WITH MAGNETIC TRACKS

[75] Inventors: Hagen Schempf; Brian Albrecht, both of Pittsburgh, Pa.

[73] Assignee: Carnegie Mellon University, Pittsburgh, Pa.

[21] Appl. No.: 62,797

[22] Filed: May 14, 1993

[51] Int. Cl.⁵ .................................... B62D 55/265
[52] U.S. Cl. ............................ 180/9.1; 180/9.44; 180/901; 901/1; 901/44
[58] Field of Search ............... 180/9, 9.1, 9.44, 9.62, 180/313, 901; 901/1, 40, 44; 114/222

[56] References Cited

U.S. PATENT DOCUMENTS

| | | | |
|---|---|---|---|
| 484,829 | 10/1892 | Stewart | 180/9.46 |
| 1,494,687 | 5/1924 | Hine | 280/415.1 |
| 1,553,777 | 9/1925 | Holldack | 280/447 |
| 2,132,661 | 10/1938 | Temple | 29/81 |
| 2,310,775 | 2/1943 | Gavagnin | 180/9.1 |
| 3,245,488 | 4/1966 | Peterson | 180/14.2 |
| 3,548,962 | 12/1970 | Best | 180/9.44 |
| 3,650,343 | 3/1972 | Helsell | 180/9.4 |
| 3,777,834 | 12/1973 | Hiraoka et al. | 180/901 |
| 3,960,229 | 6/1976 | Shio | 180/901 |
| 3,973,711 | 8/1976 | Pesegro | 180/901 |
| 4,645,023 | 2/1987 | Rea et al. | 180/9.32 |
| 4,709,265 | 11/1987 | Silverman et al. | 901/1 |
| 4,757,258 | 7/1988 | Kelly, Jr. et al. | 901/44 |
| 4,789,037 | 12/1988 | Kneebone | 180/901 |
| 4,817,653 | 4/1989 | Krajicek et al. | 180/6.2 |
| 4,828,059 | 5/1989 | Naito et al. | 180/119 |
| 4,909,341 | 3/1990 | Rippingale et al. | 180/119 |
| 4,932,831 | 6/1990 | White et al. | 414/732 |
| 5,022,812 | 6/1991 | Coughlan et al. | 414/729 |
| 5,037,486 | 8/1991 | Sloan | 134/18 |
| 5,220,869 | 6/1993 | Pelrine et al. | 180/901 |

FOREIGN PATENT DOCUMENTS

| | | | |
|---|---|---|---|
| 619549 | 10/1935 | Germany . | |
| 2417822 | 10/1975 | Germany | 901/44 |
| 3312222A1 | 10/1984 | Germany . | |
| 3811795 | 10/1989 | Germany . | |
| 2-68275 | 3/1990 | Japan | 180/901 |
| 2284897 | 11/1990 | Japan | 901/44 |
| 978600 | 12/1964 | United Kingdom | 180/901 |
| 2203108 | 10/1988 | United Kingdom . | |
| 582961 | 12/1977 | U.S.S.R. | 901/44 |
| WO87/02635 | 5/1987 | WIPO . | |
| 8707009 | 11/1987 | WIPO | 901/1 |

*Primary Examiner*—Richard M. Camby
*Assistant Examiner*—Kevin Hurley
*Attorney, Agent, or Firm*—Kirkpatrick & Lockhart

[57] ABSTRACT

A reconfigurable mobile vehicle having at least one endless driven member and a motor for driving the endless member on a surface capable of supporting a magnetic circuit. The vehicle is equipped with a magnetic system that comprises a magnet, a fixed magnetic circuit member, and a movable magnetic circuit member for establishing first and second magnetic circuits. A clutch is provided to selectively connect the movable magnetic circuit member to the motor to move the movable magnetic circuit member between a first position wherein the first magnetic circuit is established such that the endless driven member can magnetically engage the surface and a second position wherein the second magnetic circuit is established such that the endless member does not magnetically engage the surface. The vehicle is equipped with sensing apparatuses for analyzing the structural integrity of the surface upon which the vehicle is riding and is also equipped with acoustical positioning apparatus for assisting the operating personnel and computer in locating and controlling the vehicle's position within an enclosed environment. The vehicle is also equipped with a tether line that is used to facilitate the transfer of control power/data between the vehicle and the various operating components attached thereto and a control console located remote from the vehicle. The tether line is also used to deploy and retrieve the vehicle.

21 Claims, 12 Drawing Sheets

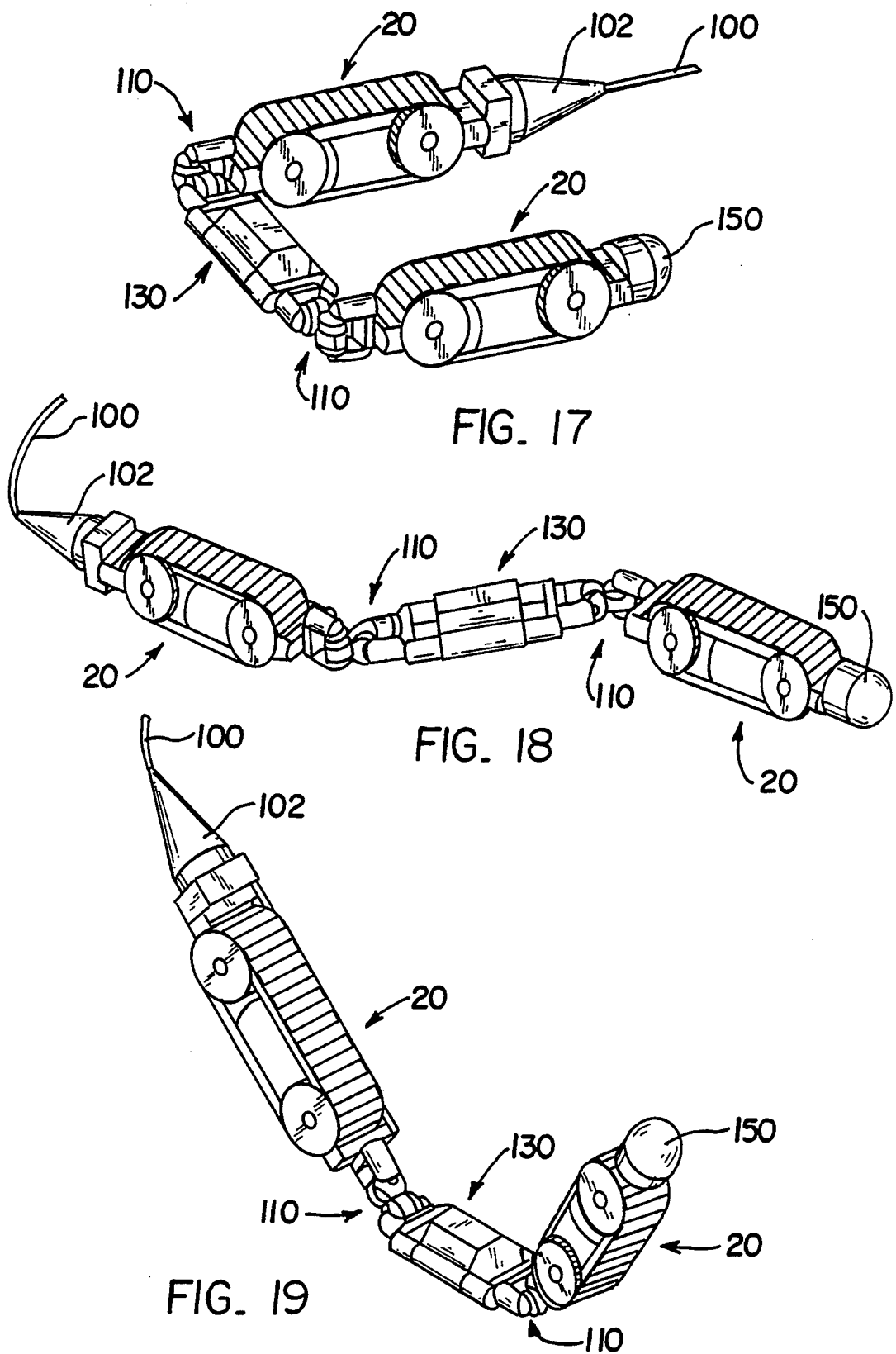

RECONFIGURABLE MOBILE VEHICLE WITH MAGNETIC TRACKS

BACKGROUND OF THE INVENTION

1. Field of the Invention

The present invention relates to mobile vehicles and, more particularly, is directed to reconfigurable mobile vehicles having selectively magnetizable propulsion means that are capable of entry into a storage tank or infrastructure having constrained entry points and that are equipped with apparatuses to perform various visual and ultrasonic thickness inspection tasks for performing corrosion assessment thereof.

2. Description of the Invention Background

Nikolaus Otto is credited with inventing the internal combustion engine in 1877. In 1908, using the principles developed by Mr. Otto, Henry Ford introduced the Model T Ford, which has been called the first affordable automobile. Little did Mr. Otto and Mr. Ford know that their inventive prowess would spawn many of the billion dollar industries that we know today.

For example, with the development of the automobile came the need for petroleum refineries and filling stations for supplying gasoline to power the automobile between destinations. Soon, filling stations began to appear all over the country. Today, there are thousands of filling stations across the United States alone.

Such filling stations typically store gasoline in steel underground tanks that are periodically replenished by fuel transport trucks that transport the fuel from similar aboveground storage tanks located at refinery to the filling station. Over the years, due to the corrosive influence of the surrounding environment, most underground and aboveground fuel storage tanks periodically develop leaks and ruptures in the walls thereof. Often, such tank leaks go undetected permitting gasoline to be slowly leached into the surrounding soil. Initially, such leaks go undetected until they become noticeably larger. However, once it is apparent that the tank is leaking, it is difficult, if not impossible using known methods and techniques, to determine the exact location of the leak without first emptying the tank.

As such, a variety of tank inspection methods have been developed. One such method involves emptying the tank and sending human inspectors into the tank in an effort to identify and repair the leak and to ascertain the tank's fuel holding integrity. That method, however, is fraught with many inaccuracies, dangers, and disadvantages, In particular, the inspectors must be equipped with explosion proof lights and inspection equipment that can be safely operated in an atmosphere containing explosive vapors and gases. In addition, the inspectors must wear respirators to protect them from inhaling harmful vapors. That additional cumbersome equipment, however, tends to hinder their ability to maneuver within the tank. In addition, this tank inspection method is very time consuming and, because the tank must be emptied before the inspection can take place, the tank cannot be used while the inspection thereof is being conducted.

Another tank inspection method involves first removing the tank's contents and thereafter further evacuating the tank. After a certain amount of vacuum is drawn within the tank, vacuum gages can be used to monitor whether there is a loss of vacuum due to air infiltration through a leak in the tank. In the alternative, sensitive listening devices may be placed within the tank to detect the inrush of air therein. That method, however, is incapable of analyzing the overall structural integrity of the tank.

Another tank inspection method involves removing the fuel from the tank and lowering a camera on a cable to view the tank's interior. This method also lacks the capability of analyzing the structural integrity of the tank's walls to identify other deteriorating portions thereof. Yet another method involves removing the tank from the ground so that its outer perimeter can be inspected. That method, however, is ineffective for detecting leaks in double-walled tanks because the integrity of the interior wall cannot be ascertained from a visual or ultrasonic inspection of the exterior tank wall.

It will be appreciated that the above-described problems are not limited to underground or above-ground storage tanks that contain gasoline or other petroleum products. Such problems may also be encountered with tanks and structures containing a variety of other hazardous or contaminated waste materials. It will be further appreciated that dams and penstocks are also plagued with similar inspection problems. In particular, those structures typically must be inspected by divers or they must be decommissioned and drained before they can be inspected.

A variety of vehicles and robots have been developed for conducting various operations in hostile or hazardous environments. Some of those vehicles are manned such as the vehicle disclosed in U.S. Pat. No. 4,645,023 to Rea et al. That vehicle, while suited for travel on a variety of terrain configurations and conditions, is ill-suited for use inside of an enclosed tank where human access is prohibited. Furthermore, that vehicle could not traverse the vertical walls or ceiling of the vessel to perform inspections thereof.

Other apparatuses have been developed for cleaning the interior of enclosed vessels such as storage tanks. In particular, the mobile, remotely powered robot disclosed in U.S. Pat. No. 4,817,653 to Krajicek et al. is equipped with a spraying device and is adapted to ride upon the floor of the tank. To use that apparatus, however, the tank must first be substantially emptied and a robot entry way must be provided through the side of the tank. The component parts of the robot are then passed through the entry way into the tank wherein they are reassembled and operated by personnel located within the tank. That device is also ill-suited for use in tanks or vessels where, due to the nature of the material stored therein, human access is prohibited. In addition, the Krajicek apparatus could not be used to inspect storage tanks that may be substantially weakened by providing therein an entryway large enough to permit the passage of the robot's components therethrough.

Other robots adapted to operate in hostile environments are known. For example, U.S. Pat. No. 4,932,831 to White et al. and U.S. Pat. No. 5,022,812 to Coughlan et al. disclose track-propelled robots that can be operated from a remote location by means of a tether line that is attached to the robot. Those apparatuses, while somewhat compact, are not collapsible to the extent necessary to permit them to be entered into an enclosed area through a small existing manway or pipe riser therein. In addition, those vehicles cannot traverse along the vertical sides and ceiling of the tank or vessel to perform inspections thereof.

Still other single tracked vehicles are known that could be adapted for entry into a vessel through a small opening therein. For example, U.S. Pat. No. 3,548,962 to Best and U.S. Pat. No. 4,909,341 to Rippingale et al. disclose single tracked articulated vehicles that are capable of assuming a variety of different configurations. Those vehicles, much like the vehicles disclosed in the above-mentioned patents, cannot travel around the vertical walls and ceiling of a tank or vessel to perform various inspection tasks.

A wall-crawling vehicle has been developed, however, by Naito et al. and is disclosed in U.S. Pat. No. 4,828,059. That apparatus comprises a dual or triple-tracked vehicle that, due to its large size, would be unable to enter an enclosed vessel through a small existing manway or pipe riser therein. In addition, the vehicle obtains it wall-crawling abilities by a plurality of permanent magnets attached to the outer perimeter of the crawler tracks. The apparatus is equipped with a guide device adapted to selectively cause the magnets to move between positions wherein they can magnetically engage the wall surface and a position wherein they do not magnetically engage the wall surface. However, if during the course of operation, operational power should be lost to the guide device, the permanent magnets would remain magnetically attached to the walls of the vessel, thus, making it difficult, if not impossible, to retrieve the apparatus from the vessel. In addition, this apparatus would be ill-suited for travel in a vessel containing some loose magnetic material, as that material could collect around the track and frame and hamper the operation of the guide device.

Thus, there is a need for a vehicle that can enter an enclosed structure through a constrained entry point and be safely operated by personnel located outside of the structure to perform a variety of inspection and other tasks within the structure. There is a further need for a vehicle that can safely perform a variety of tasks within a vessel containing liquid material without first removing the material from the vessel. There is still another need for a remotely operable vehicle that can enter an enclosed vessel through a constrained entry point and travel along the vessel walls, bottom and ceiling to assess the structural integrity of the vessel.

SUMMARY OF THE INVENTION

In accordance with the present invention, there is provided a mobile vehicle for use in a vessel having walls with interior surfaces capable of supporting a magnetic circuit. The vehicle comprises a frame member and an endless driven member that is operably received on the frame member for travel on the interior surfaces of the vessel. A motor is provided for driving the endless member. A magnetic system is also attached to the frame member and comprises a magnet, a fixed magnetic circuit member, and a movable magnetic circuit member for establishing first and second magnetic circuits. A clutch is provided to selectively connect the movable magnetic circuit member to the motor to move the movable magnetic circuit member between a first position wherein the first magnetic circuit is established between the endless member, the magnet, and the fixed and movable magnetic circuit members such that the endless member can magnetically engage one of the interior surfaces of the vessel, and a second position wherein the second magnetic circuit is established between the magnet and the fixed and movable magnetic circuit members such that the endless member does not magnetically engage one of the interior surfaces of the vessel, It is an object of the present invention to provide a mobile vehicle that can be entered into an enclosed area having constrained entry points to perform a variety of tasks therein, It is another object of the present invention to provide a mobile vehicle that can be remotely operated in an enclosed area by personnel located outside of the enclosed area.

Yet another object of the present invention is to provide a mobile vehicle that has drive members adapted to engage the walls of a steel vessel such that the vehicle can drive thereupon and collect corrosion data pertaining thereto.

Still another object of the present invention is to provide a mobile vehicle that can perform corrosion data collection in enclosed vessels that house an explosive or non-explosive liquid material therein without first removing that material from the vessel.

Another object of the present invention is to provide a vehicle constructed from component parts that may be arranged in a serial or parallel arrangement depending upon the size of the opening through which it is to be deployed.

Another object of the present invention is to provide a mobile vehicle that can assume a first position such that it can pass through a constrained opening and then reconfigure itself into a variety of different configurations that are suited to the terrain being traversed.

Accordingly, the present invention provides solutions to the aforementioned problems associated with detecting leaks and analyzing the structural integrity of fuel storage vessels and the like. The reader will appreciate that, in addition to the aforementioned details and objects, other advantages associated with the use of the present invention will become apparent as the following detailed description of the present preferred embodiment thereof proceeds.

BRIEF DESCRIPTION OF THE DRAWINGS

In the accompanying drawings, there is shown a preferred embodiment of the invention wherein like reference numerals are employed to designate like parts and wherein:

FIG. 17 is a perspective view of configuration assumable by the vehicle of the present invention;

FIG. 18 is a perspective view of yet another configuration assumable by the vehicle of the present invention; and FIG. 19 is a perspective view of still another configuration assumable by the vehicle of the present invention.

DETAILED DESCRIPTION OF A PREFERRED EMBODIMENT

Figure 1:
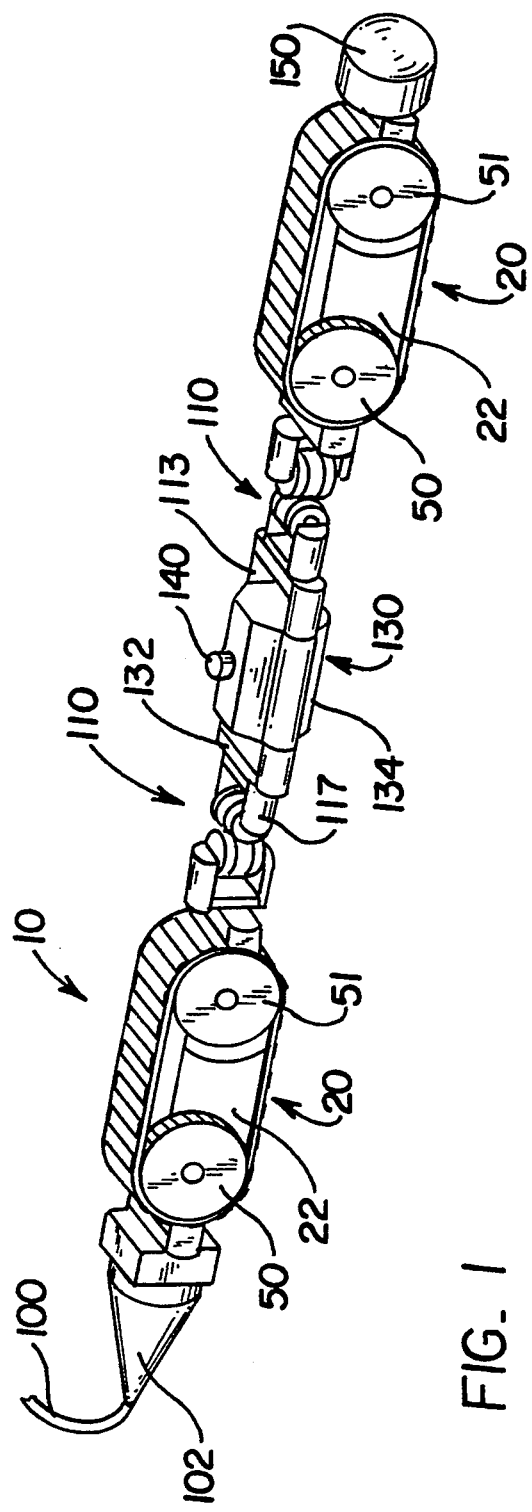
FIG. 1 is a perspective view of a preferred vehicle assembly of the present invention.

Referring now to the drawings for the purposes of illustrating a present preferred embodiment of the invention only and not for purposes of limiting the same, the Figures show a reconfigurable mobile vehicle 10 that is particularly well adapted for deployment into underground and aboveground storage tanks containing a variety of different liquid or solid materials. The skilled artisan will readily appreciate, however, that the subject invention can be deployed into and used in a variety of other enclosed and non-enclosed areas having constrained access points.

More particularly and with reference to FIG. 1, there is shown a preferred mobile vehicle, generally designated as 10, that preferably comprises two independently powered and controlled track modules 20 and a sensor module 130 that is interconnected between the track modules 20 in serial arrangement by steering modules 110.

Figure 2:
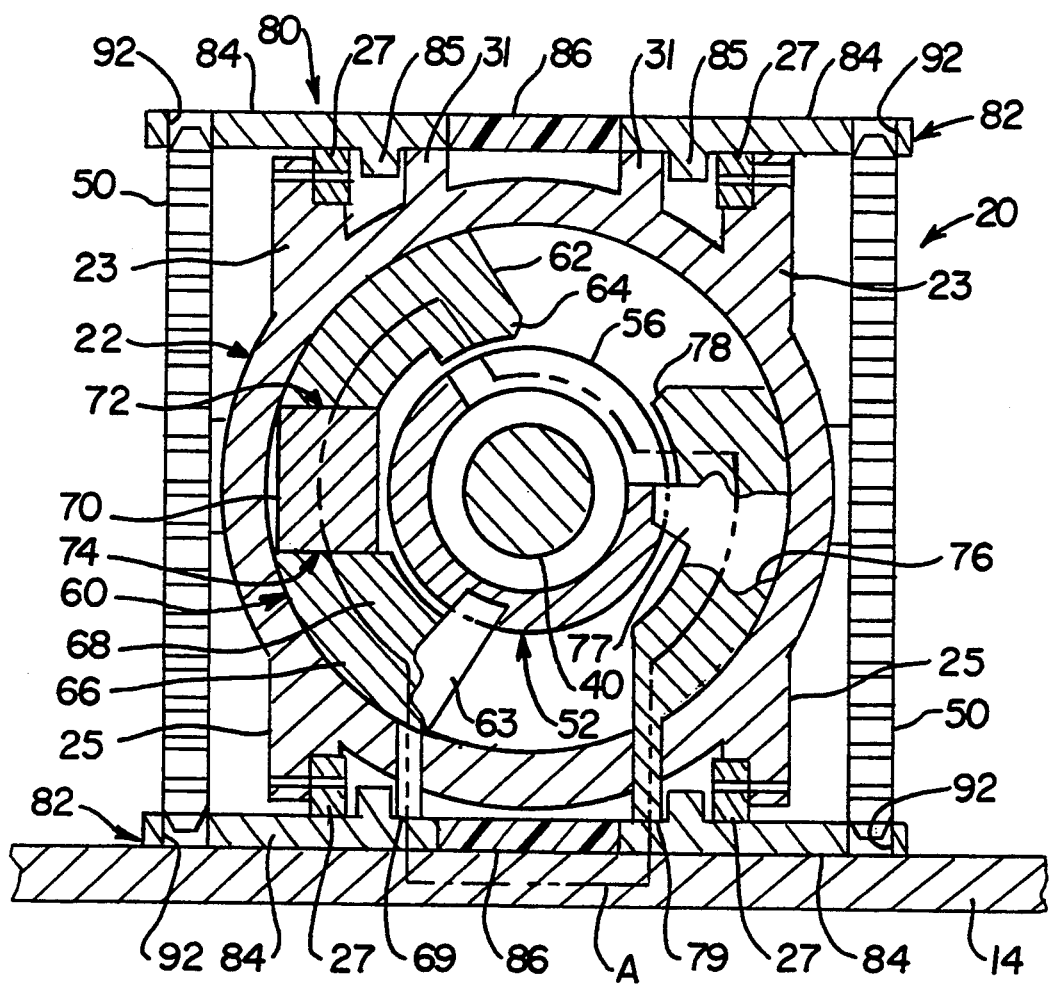
FIG. 2 is a partial cross-sectional elevational view of a track module of the present invention with the hollow cylindrical member thereof being rotated to a first magnetic circuit creating position.
Figure 3:
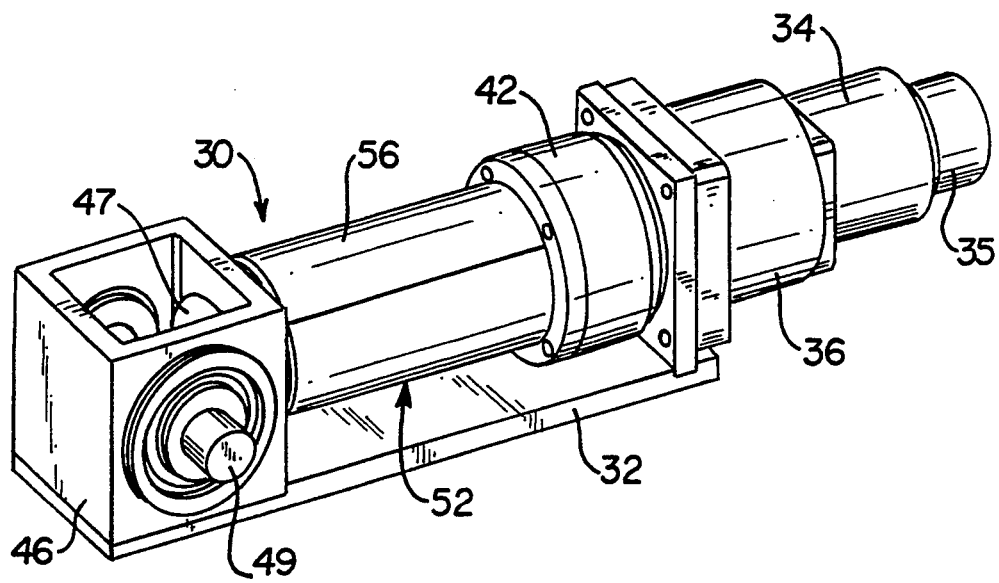
FIG. 3 is a perspective view of the drive assembly of the track module of FIG. 2.
Figure 4:
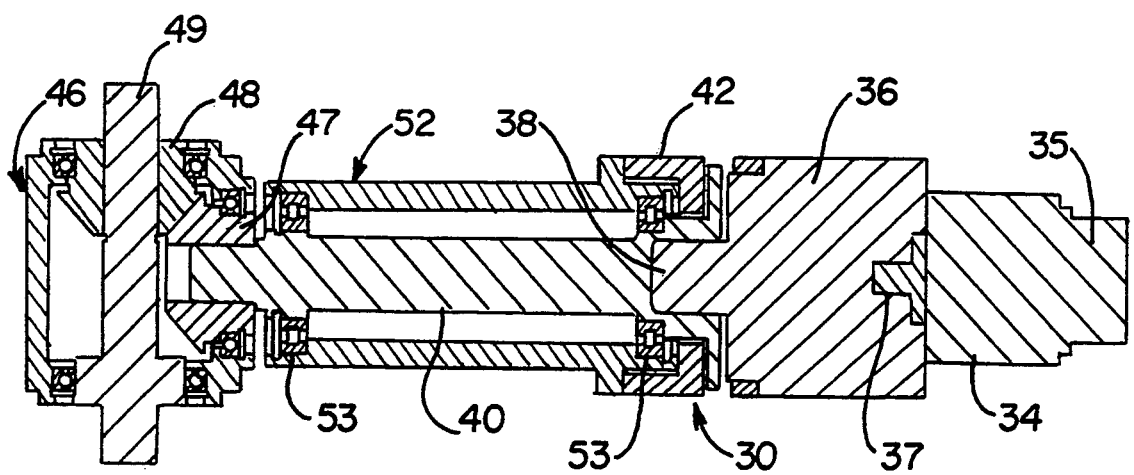
FIG. 4 is a longitudinal cross-sectional view of the drive assembly of FIG. 3.

As can be seen in FIG. 2, each track module 20 includes a hollow cylindrical housing 22 that is preferably fabricated from non-magnetic stainless steel or other suitable material having similar corrosion resistance and non-magnetic properties. Received within the housing 22 is drive assembly 30 that, in a preferred form, includes a stand member 32 that coaxially supports a drive motor 34, a planetary gear box 36, a drive shaft 40, a toothed clutch assembly 42 and a bevel gear box 46 arranged as illustrated in FIGS. 3 and 4. More specifically, the drive assembly 30 is preferably powered by an electrically driven motor 34 that has a resolver/brake 35 operatively connected thereto. In a preferred embodiment, a motor and resolver/brake combination such as Model No. DC-11000 manufactured by SL-Montevideo Technology, Inc. of 2002 Black Oak Avenue, Montevideo, Minn. 56265 are used. However, the skilled artisan will recognize that other pneumatic and hydraulic powered motors may also be used to power a track module 20.

Attached to the output shaft 37 of motor 34 is planetary gear box 36. As can be seen in FIG. 4, the output shaft 38 of planetary gear box 34 is attached to a drive shaft 40. Drive shaft 40 is operatively connected to a bevel gearbox generally designated as 46. In particular, bevel gear box 46 contains a first bevel gear 47 that is attached to the end of the drive shaft 40. A second bevel gear 48, arranged at right angles to the first bevel gear 47 and meshing therewith, is attached to an output shaft 49 which, as will be discussed in further detail below, has drive sprockets 50 attached thereto.

As can most particularly be seen in FIG. 4, a hollow cylindrical shaft 52 is coaxially and rotatably supported on drive shaft 40 by bearings 53. The skilled artisan will appreciate that such construction permits the drive shaft 40 to independently rotate with respect to the hollow cylindrical shaft 52. Communicating with the drive shaft 40 and the hollow cylindrical shaft 52 is a solenoid operated toothed clutch 42. Clutch 42 is configured to permit the hollow cylindrical shaft 52 to be selectively locked to the drive shaft 40 to rotate therewith such that the hollow cylindrical shaft 52 is caused to rotate to at least two predetermined positions as will be further discussed below.

Figure 5:
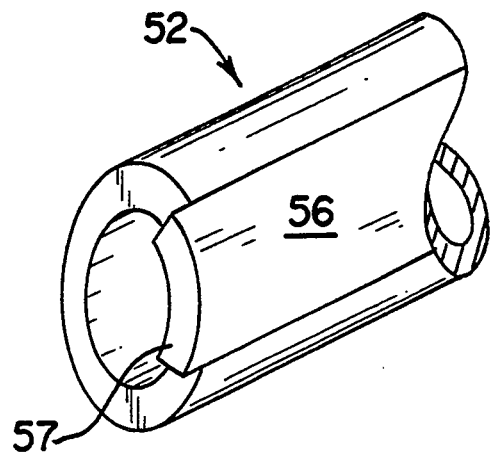
FIG. 5 is a partial perspective view of the hollow cylindrical member of the drive assembly of FIG. 4.
Figure 6:
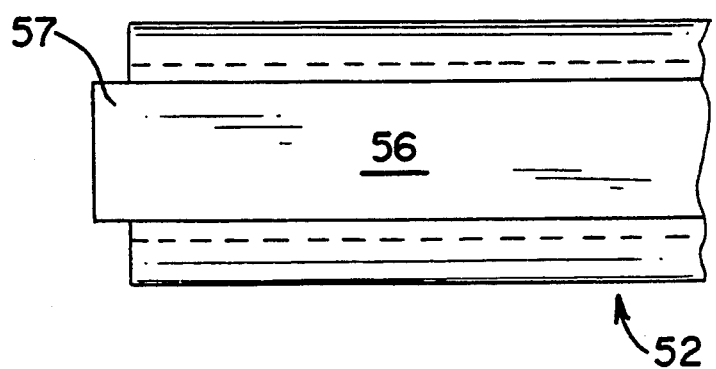
FIG. 6 is a partial side elevational view of the hollow cylindrical member of FIG. 5.

The hollow cylindrical shaft 52 is preferably fabricated from a non-magnetic material such as non-magnetic stainless steel and is fitted with a magnetic circuit portion 56 (preferably fabricated from magnetic stainless steel) that extends along the longitudinal length thereof. See FIGS. 5 and 6. A portion 57 of the magnetic circuit portion 56 preferably extends outwardly approximately ⅛" past the end of the hollow cylindrical shaft 52 in the manner illustrated in FIGS. 5 and 6.

Figure 7:
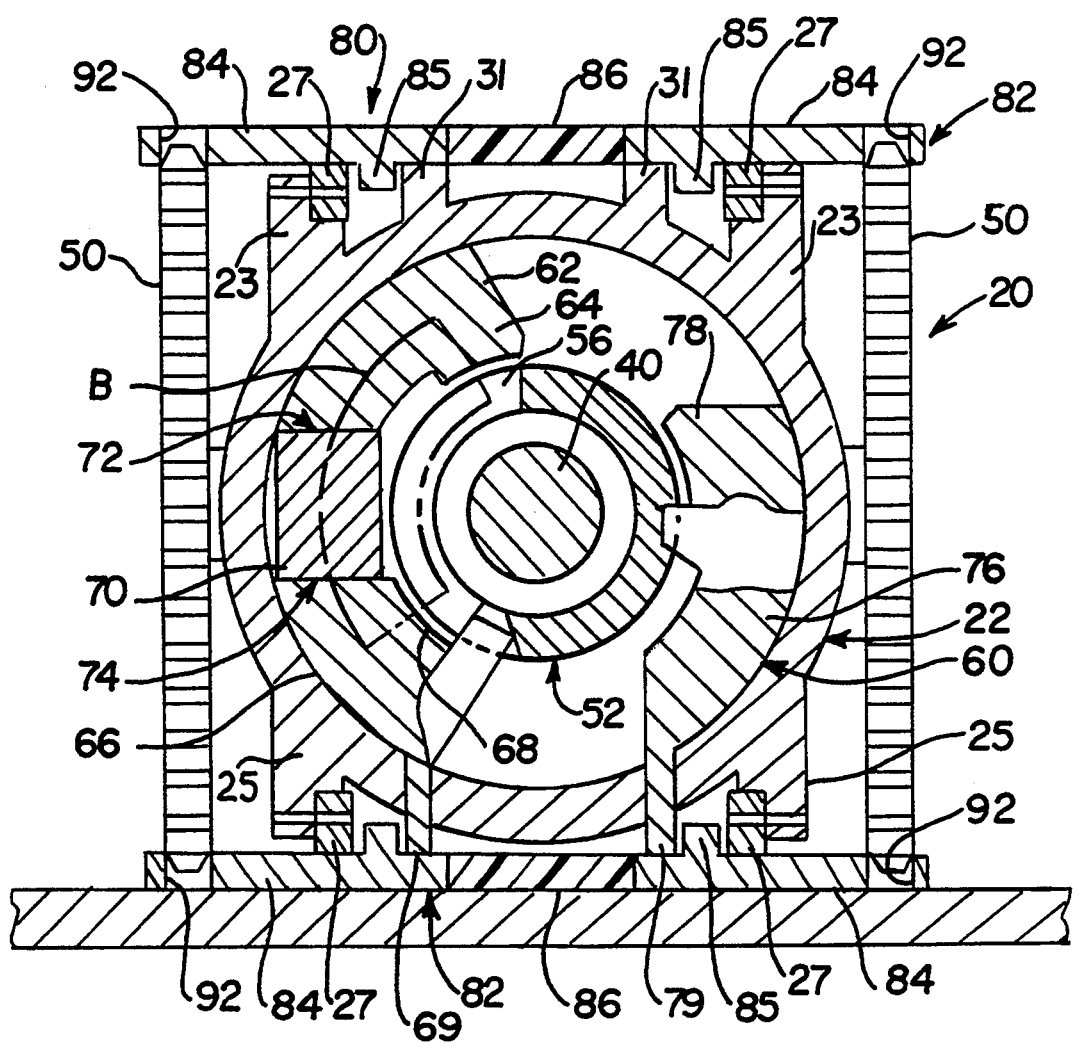
FIG. 7 is another partial cross-sectional elevational view of the track module of FIG. 2 with the hollow cylindrical member thereof being rotated to a second position.

A multi-piece yoke member, generally designated as 60, is arranged to surround the hollow cylindrical shaft 52 as shown in FIGS. 2 and 7. In a preferred embodiment, the yoke member 60 comprises an upper magnetic circuit piece 62, a first lower magnetic circuit piece 66, a permanent magnet 70 having a north pole 72 and a south pole 74, and a second lower magnetic circuit piece 76. The upper magnetic circuit piece 62 is preferably fabricated from a magnetic material such as, for example, iron or magnetic stainless steel and is arcuate in shape and has an arcuate shaped, outwardly extending arm portion 64 as shown in FIGS. 2 and 7. The upper magnetic circuit piece 62 is preferably fastened to the interior of housing 22 by a collection of clamps (not shown) such that an airspace of preferably not more than approximately 0.0625" is maintained between the arm portion 64 and the outer perimeter of the hollow cylindrical shaft 52.

The first lower magnetic circuit piece 66 is also preferably fabricated from a magnetic material such as iron or magnetic stainless steel and is arcuate in shape and has an outwardly extending arm portion 68. The first lower magnetic circuit piece 66 is preferably fastened to the interior of housing 22 by collection of clamps or screws (not shown) such that an airspace of preferably not more than approximately 0.0625" is achieved between the arm portion 68 and the outer perimeter of the hollow cylindrical shaft 52. In addition, the first lower magnetic circuit piece 66 has a downwardly extending leg portion 69 that extends through the housing 22 as shown in FIGS. 2 and 7. In a preferred embodiment the leg portion 69 is arranged such that an air space of preferably not more than approximately 0.0625" is achieved between the end portions 84 of the track cleats 82 and the end of the leg portion 69. The first lower magnetic circuit piece 66 also preferably has an inwardly extending stop member 63 attached thereto that is arranged to engage the outwardly extending portion 57 of the magnetic circuit piece 56 in the manner discussed below.

Attached to the upper magnetic circuit piece 62 and the first lower magnetic circuit piece 64 and extending therebetween is the permanent magnet 70. Permanent magnet 70 is preferably fastened to the upper magnetic circuit piece 62 and the first lower magnetic circuit piece 64 by appropriate glue or screws (not shown). Positioned as shown in FIGS. 2 and 7, is a second lower magnetic piece 76 that is arcuate in shape and is preferably fabricated from iron or magnetic stainless steel. Second lower magnetic circuit piece 76 also has an outwardly extending arm portion 78 and is positioned such that an airspace of preferably not more than approximately 0.0625" is maintained between the arm portion 78 and the hollow cylindrical shaft 52. The second lower magnetic circuit piece 76 also has a downwardly extending leg portion 79 that extends through the housing 22 and is arranged such that an airspace of preferably not more than 0.0625" is created between the end portions 84 of the track cleats 82 and the end of the leg portion 79. Also attached to the second lower magnetic circuit piece 76 is a second stop member 77 that is arranged to engage the extended portion 57 of magnetic circuit member 56.

Figure 8:
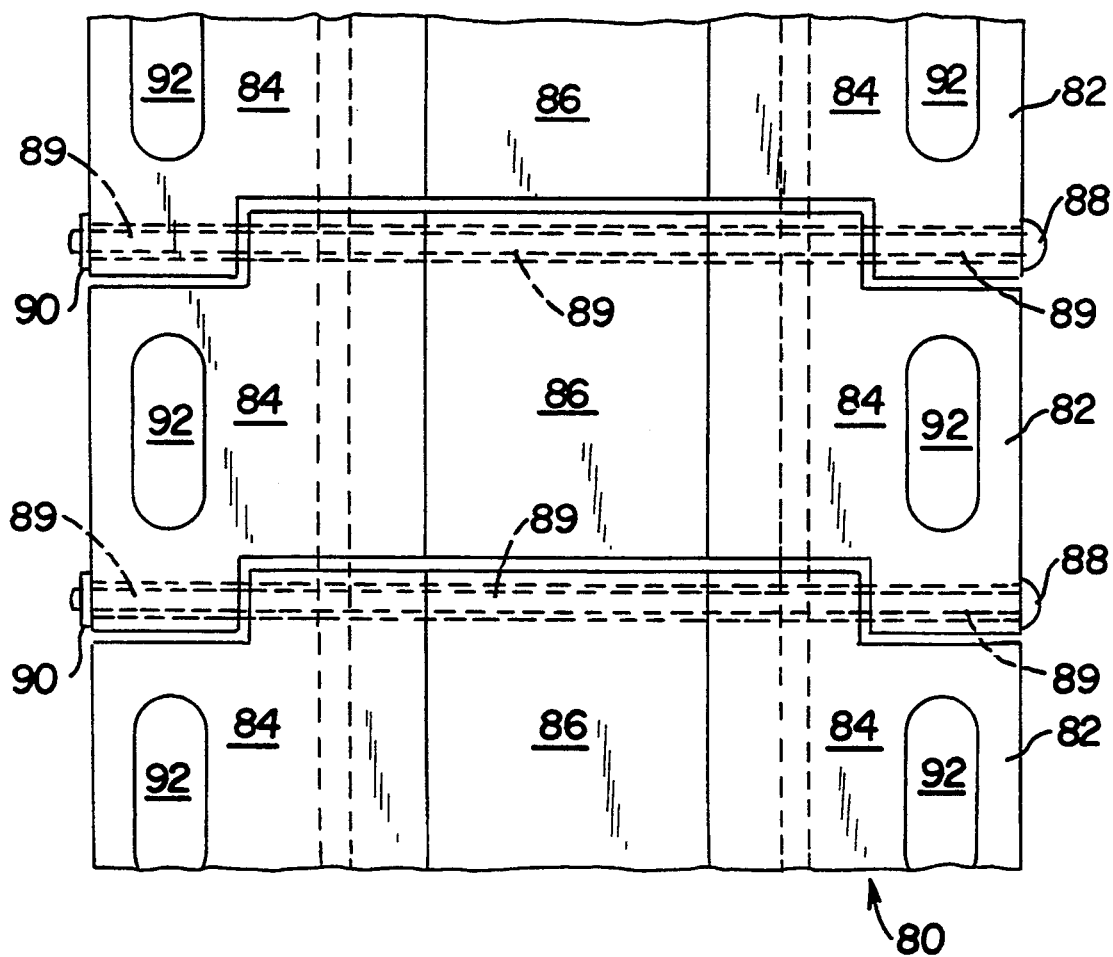
FIG. 8 is a top view of a portion of the endless track of the track module of FIG. 2.

The track module 20 is propelled by an endless track 80 that comprises a plurality of track cleats 82 that are pivotally interconnected connected together as shown in FIG. 8. In particular, each track cleat 82 has two end portions 84 that are fabricated from a magnetic material such as, for example, magnetic stainless and a central portion 86 that is fabricated from a non-magnetic material such as brass. In a preferred embodiment, the end portion 84 and the central portion 86 are fastened together by screws (not shown) to form one continuous cleat 82. Preferably, the cleats 82 are pivotally interconnected by a pin member 88 that extends through bores 89 in the end portions 84 and central portions 86 of each cleat 82. The pins are preferably retained in position by removable clips 90; however other removable fasteners may be used.

The endless track 80 is driven by two drive sprockets 50 that are received on shaft 49. Two additional idler sprockets 51 are also provided at the opposite end of the track module 20 from the drive sprockets 50 for rotatably supporting the endless track 80 thereon. See FIG. 1. In a preferred embodiment seals (not shown) are provided between shaft 49 and housing 22 to create a fluid-tight seal therebetween. Similar seals are also provided to create a fluid-tight seal between the idler sprocket shaft (not shown) and the housing 22. The teeth of sprockets 50 and 51 are adapted to extend through teeth engaging openings 92 that are provided in each end portion 84 of each cleat 82 as shown in FIG. 8.

As can also be seen in FIGS. 2 and 7, housing member 22 has two upwardly extending longitudinal support members 23 and two downwardly extending longitudinal support members 25 that have rotatably pinned thereto support rollers 27 that rollably support the endless track 80 on the housing 22. Preferably, support rollers 27 are fabricated from a nonmagnetic material that has excellent friction reducing properties. In a preferred embodiment, rollers 27 are fabricated from teflon; however, other suitable materials may be used. As can also be seen in FIGS. 2 and 7, the upper portion of the housing 22 has two additional upwardly extending longitudinal retaining bosses 31 that cooperate with downwardly extending bosses 85 on each end portion 84 of each track cleat 82 to restrict the lateral travel of the endless track 80 on the housing 22 to thereby prevent the track 80 from being laterally disengaged from the sprockets 50 and 51.

As can be seen in FIG. 1, operational power is supplied to the track module 20 by means of a tether line 100 that is attached to the housing 22 by a tether attachment member, generally designated as 102. Such tether attachment members are well known in the art concerned with the deployment and operation of undersea vehicles. For example, the ball joint tow point adapter and termination and tether strain relief apparatuses manufactured by PMI Industries, Inc. of 5300 St. Clair Avenue, Cleveland Ohio are well suited for attaching the tether line 100 to a track module 20.

The driving and magnetic engagement of the endless track 80 of a track module 20 with a surface 14 capable of supporting a magnetic circuit such as steel or iron will now be described with reference being specifically made to FIGS. 2 and 7. As was discussed above, the endless track 80 is driven by the drive sprockets 50 that are received on drive shaft 49. By supplying operational power to motor 20, drive shaft 40 is caused to rotate in a desired direction. That rotational motion is transferred to shaft 49 through bevel gear box 46 which ultimately causes the drive sprockets 50 to rotate and drive the endless track 80 around the housing 22. It will be appreciated that in a preferred embodiment, the motor 34 is selectively reversible thus making it possible to drive the endless track 80 in a forward or rearward direction.

One of the novel features of the present invention is its ability to magnetically engage and drive upon the walls and/or ceiling of an enclosed vessel manufactured from steel or other material capable of conducting a magnetic circuit. In particular, when it is desired to have the endless track 80 magnetically engage the surface 14, clutch 42 is engaged to cause the hollow cylindrical shaft 52 to rotate to a first magnetic circuit creating position as shown in FIG. 2. In particular, clutch 42 is engaged to rotate the hollow cylindrical shaft 52 until the extended portion 57 contacts stop member 77 as shown in FIG. 2. At this point, the hollow cylindrical shaft 52 can no longer be rotated in that direction and the clutch 42 is thereafter disengaged. The first magnetic circuit, depicted by flux line "A" in FIG. 2 causes the end portions 84 of the track cleats 82 that are adjacent to the surface 14 to magnetically engage surface 14. In particular, the magnetic flux from permanent magnet 70 flows through upper magnetic circuit piece 62, through the magnetic portion 56 of hollow cylindrical shaft 52, through the second lower magnetic circuit piece 76, into end portions 84 of the track cleats 82, through the surface 14, back through the end portions 84 of track cleats 82, through the first lower magnetic circuit piece 66 and back to the permanent magnet 70 thereby creating a continuous magnetic circuit. The skilled artisan will readily appreciate that, when the track module 20 is magnetically engaged to the surface 14, it may be propelled therealong by driving the drive sprockets 50 in the manner described above. As such, the track module 20 can be driven along the vertical walls and ceiling of a closed vessel to perform a variety of different inspection tasks.

A track module 20 may also be driven along a surface 14 without being magnetically engaged therewith in the following manner. More specifically, to cause the magnetic circuit described above and represented by flux line "A" in FIG. 2 to be reconfigured so that the magnetic engagement between the endless track 80 and the surface 14 is discontinued, clutch 42 is engaged so as to cause the hollow cylindrical shaft 52 to rotate to a second magnetic circuit creating position wherein the extended portion 57 of magnetic circuit portion 56 contacts stop member 63 as shown in FIG. 7. After the extended portion has contacted the stop member 63 and the hollow cylindrical shaft 52 cannot rotate any further in that direction, clutch 42 is disengaged. When in that position, the portion of the hollow cylindrical shaft 52 that extends between the arms 64 and 78 is incapable of conducting a magnetic circuit therethrough and therefore the magnetic circuit depicted in FIG. 2 is broken. As such, the endless track 80 is free to ride upon the surface 14 without any magnetic attraction existing therebetween. It will be appreciated that, when the hollow cylindrical shaft 52 is rotated to that second magnetic circuit creating position, shaft 52 is retained in that position by virtue of the magnetic circuit represented by flux line "B" in FIG. 7. As such, the hollow cylindrical shaft 52 is prevented from accidentally rotating to the first magnetic circuit creating position as the track module 20 is driven, perhaps, over uneven surfaces or terrain.

Figure 9:
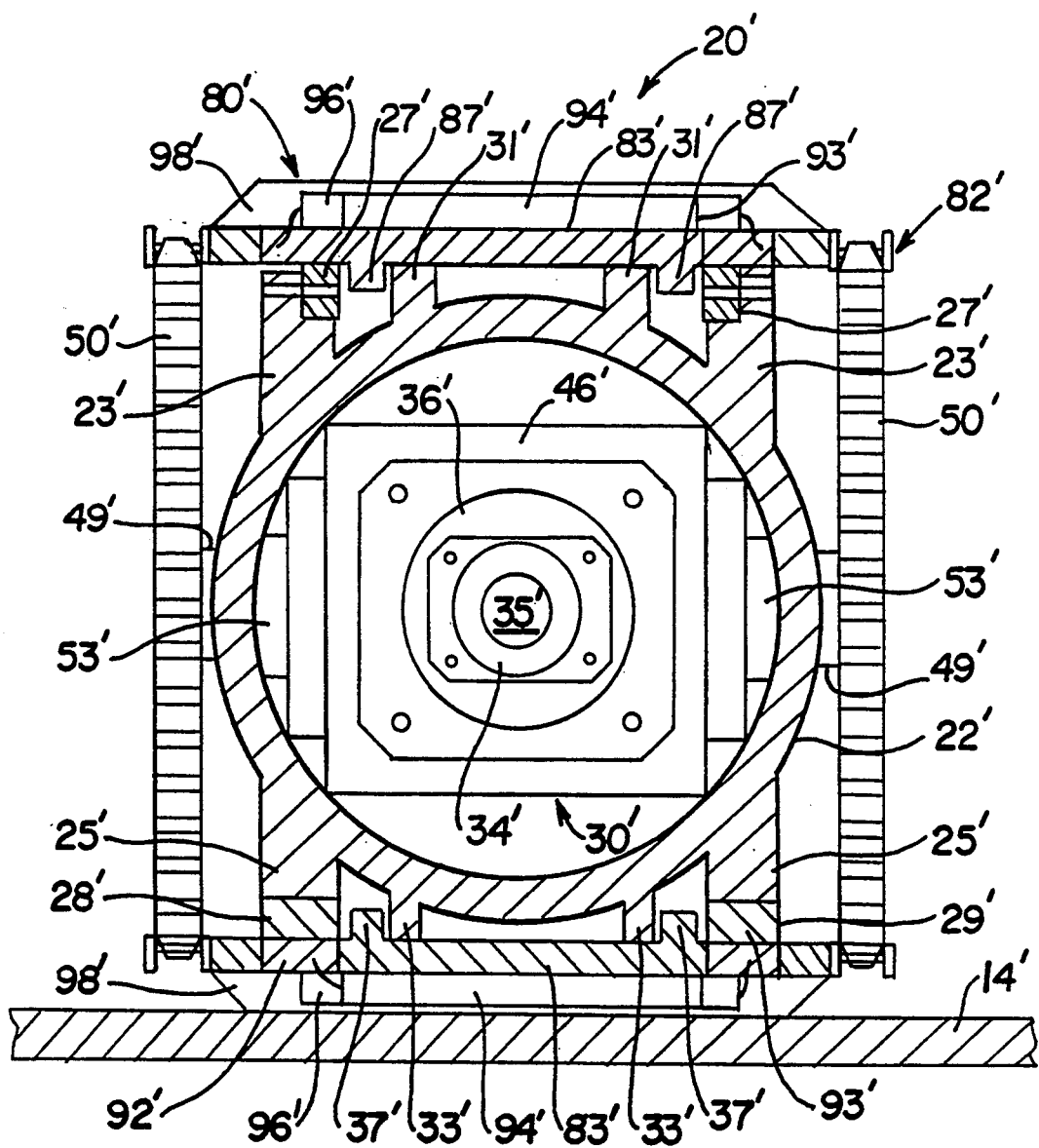
FIG. 9 is a partial cross-sectional elevational view of another track module of the present invention.
Figure 10:
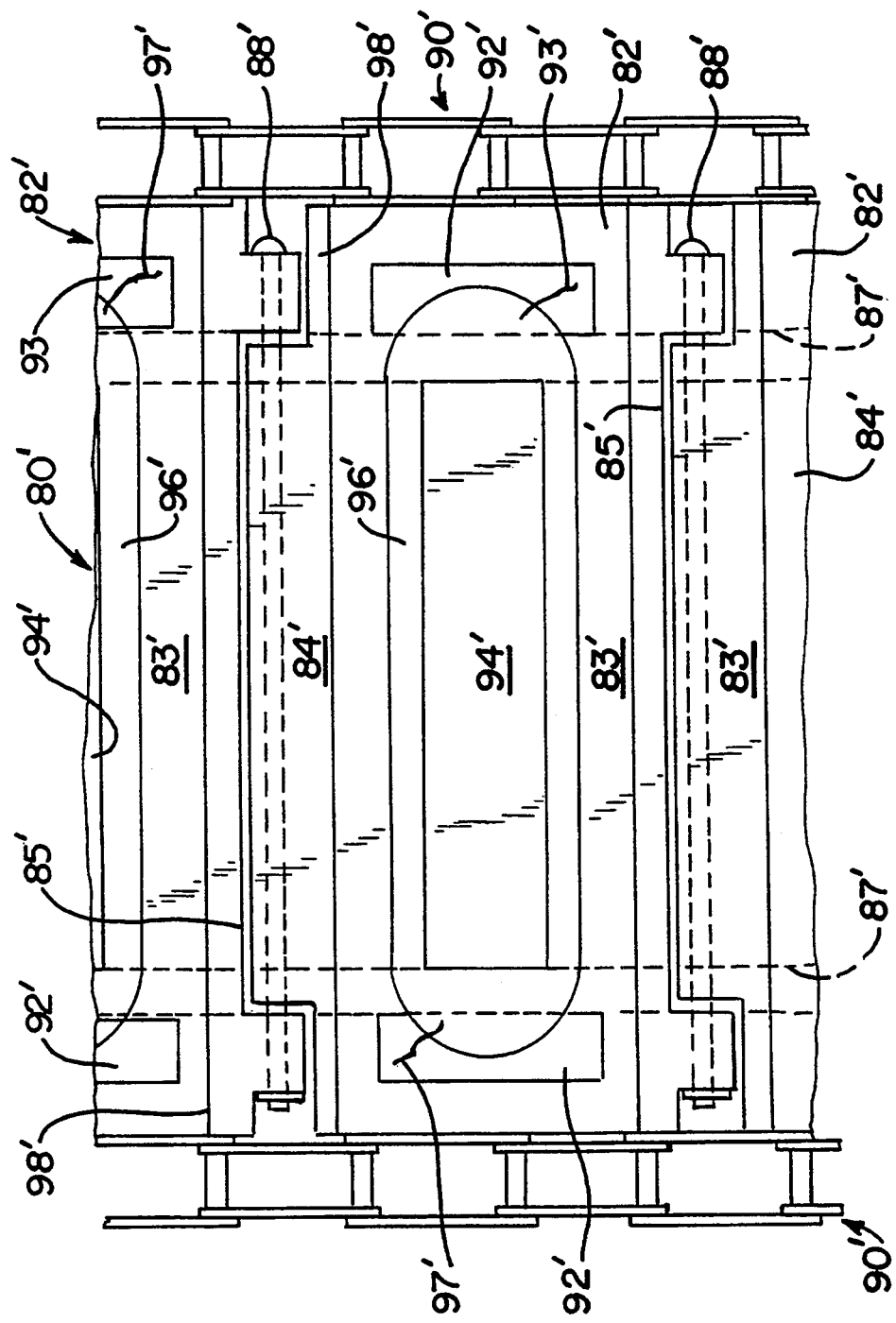
FIG. 10 is a top view of a portion of the endless track of the track module of FIG. 9.
Figure 11:
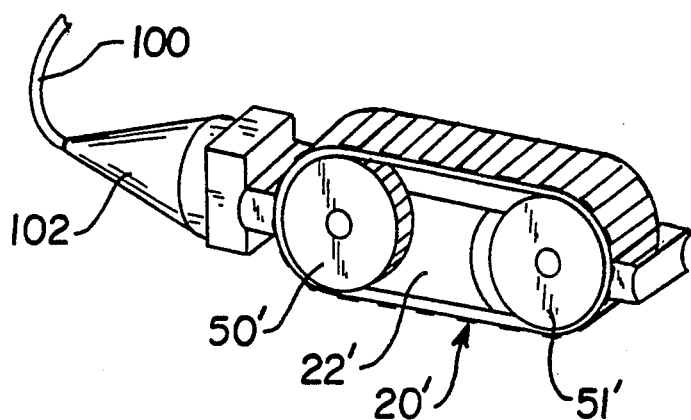
FIG. 11 is a perspective view of a vehicle powered by a single track module of FIG. 2.

Another track module embodiment is depicted in FIGS. 9–11. In that embodiment, the track module 20' comprises a housing member 22' that is preferably fabricated from non-magnetic stainless steel or other material having similar properties thereto. Housed within the housing 22' is a drive unit 30' that is powered by an electrically powered motor 34' that is equipped with a resolver/brake 35'. The motor 34' can be of the type described hereinabove; however, the skilled artisan will readily appreciate that other pneumatically or hydraulically powered motors may also be used.

Attached to the output shaft (not shown) of the motor 34' are planetary gears 36'. The output shaft (not shown) from the planetary gears 36' is operatively coupled to a bevel gear box 46' that has an output shaft 49' extending therefrom on both sides thereof as shown in FIG. 9. Output shaft 49' extends through the housing 22' to receive thereon drive sprockets 50'. Seals 53', fabricated from material that is compatible with the materials and environment in which the module 20' will be operating are provided in a known manner around output shaft 49' to provided a fluid-tight seal between the shaft 49' and the housing 22'. Two additional idler sprockets 51' are mounted to the other end of the track module 20' but are not interconnected to the above-described drive train 30'.

As can most particularly be seen in FIG. 9, the housing 22' is equipped with two upwardly extending longitudinal support members 23' that extend along the length of the housing 22'. The upwardly extending longitudinal support members 23' have rotatably pinned thereto, along the length thereof, support rollers 27' that rollably support the endless track 80' on the housing 22'. In addition, the housing 22' also has two downwardly extending longitudinal support members 25' that extend along the length of the housing 22'. One support member 25' has a copper bar 28' attached thereto and extends along the length thereof and the other support member 25' has a copper bar 29' attached thereto as shown in FIG. 9.

FIGS. 9 and 10 illustrate the preferred endless track construction for this embodiment of the present invention. As can be seen in those Figures, the endless track 80' consists of a plurality of pivotally interconnected cleat members 82'. Each cleat member 82' comprises a base member 83' that is preferably fabricated from stainless steel in the illustrated configuration. Each base member 83' is equipped with an extended portion 84' and a recessed portion 85' and are pivotally interconnected to adjacent base members 83' as shown in FIG. 10 by a removable pin member 88'. Drive chains 90' are also removably attached (e.g., by screws) to the ends of the base members 83' to enable the endless track 80' to be received on sprockets 50' and 51'. Each base member 83' is equipped with two downwardly extending bosses 87' that are received between the support rollers 27' and two upwardly extending guide members 31' that extend along the upper length of the housing 22'. The bottom portion of the housing 22' is also preferably provided with two downwardly extending guide members 33' that serve to retain the bosses 87' between the guide members 33' and the downwardly extending longitudinal support members 25' to restrict the lateral travel of the track 80' on the housing 22'.

Attached to each of the base members 83' by, for example, mechanical fasteners such as cap screws (not shown) are two copper plate members 92' and 93'. In addition, each base member 83' has attached thereto (by mechanical fasteners such as screws—not shown) a plate member 94' preferably fabricated from iron or similar material. Each plate member 94' has a wire winding around the perimeter thereof that consists of a plurality of wires that are collectively designated as 96' in FIGS. 9 and 10. As can most particularly be seen in FIG. 10, the winding 96' is attached to the copper bars 92' and 93' by lead wires 97'. Preferably, the entire plate and winding assembly is encapsulated in an epoxy potting material generally designated as 98'.

The magnetic attraction between the track cleats 82' located along the bottom of the housing 22' and the surface 14' upon which the track module is riding is selectively achieved as follows. Electrical power is supplied to the copper bar 28' via a lead wire (not shown). The reader will appreciate that electrical power is supplied to the track module by the tether 100' and the tether termination member 102' in the same manner as was described above. As the cleats 82' are driven along the bottom of the housing 22' by the drive sprockets 52' the copper bars 92' of each cleat are brought into electrical contact with the copper bars 28' attached to the housing 22'. Electrical current flows from the copper bar 28' through the copper bars 92' on each cleat 82', through the lead wires 97' and into the winding 96' of each cleat 82'. The electrical circuit is completed by contact between the copper bars 93' and copper bar 29'. The skilled artisan will readily appreciate that the above-described arrangement causes each track cleat 82 to function as an electro-magnet which magnetically engages the steel surface 14' upon which the track module 20' is riding. To discontinue the magnetic engagement of the track module 20' with the surface 14', the electrical power supplied to the copper bar 28' is discontinued. The skilled artisan will readily appreciate that if power is lost to the vehicle, the endless track 80' will no longer magnetically engage the surface 14' upon which it is traveling. Therefore, the vehicle 10 can then be easily retrieved from the vessel without being hampered by the magnetic attraction of the track 80' with the walls of the vessel. As such, this embodiment of the present invention is most advantageous when compared to vehicles having permanent magnets affixed to their tracks, as those vehicles are much more difficult to retrieve from the vessel due to their continuous magnetic attraction with the walls of the vessel. Also, the permanent magnet cleats of such vehicles can become fouled with loose magnetic material that is found within the vessel.

Figure 12:
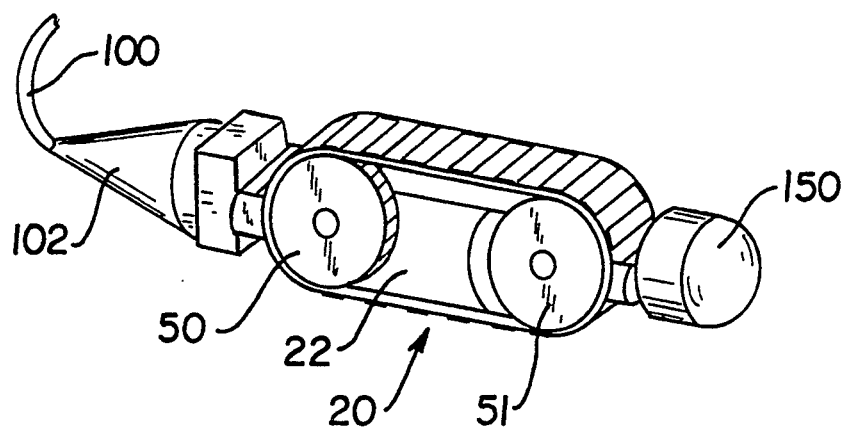
FIG. 12 is a perspective view of a vehicle powered by a track module of FIG. 9.
Figure 13:
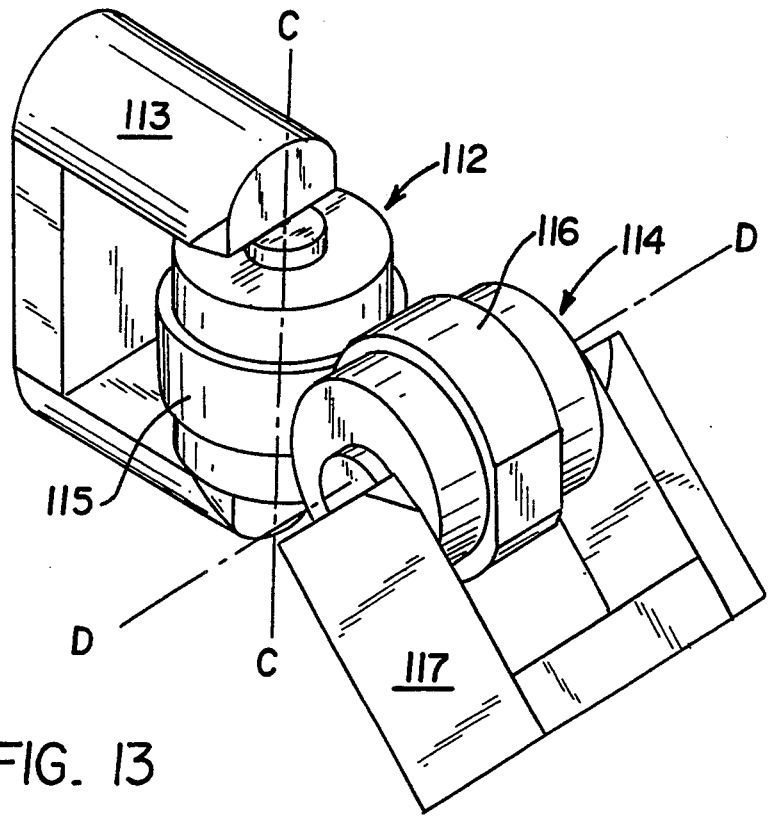
FIG. 13 is a perspective assembly view of a steering module of the present invention.
Figure 14:
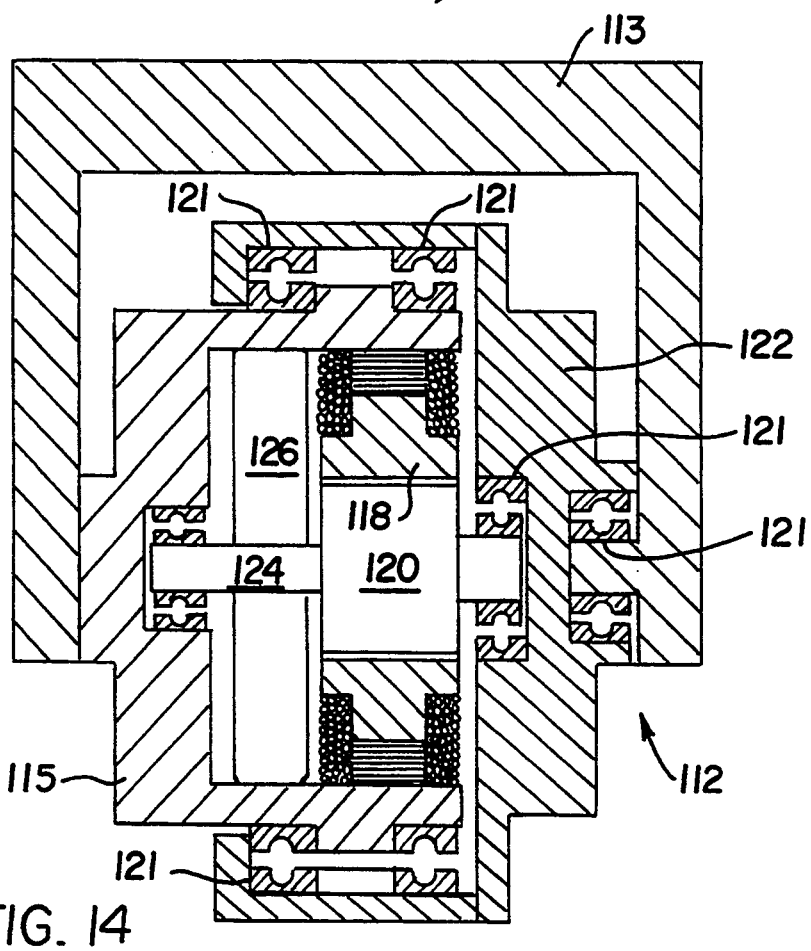
FIG. 14 is a is a cross-sectional view of a typical pitch/yaw actuator of the steering module of FIG. 13.

As illustrated in FIG. 12, a single track module 20 can be adapted for travel in an enclosed environment regardless of which magnetic system arrangement is used. Such single track vehicle is particularly well adapted to travel into continuous pipelines for performing a variety of tasks therein. Operational power is supplied to the module by the tether 100. A camera and other inspection and sampling devices (as will be discussed in further detail below) may be attached to the housing 22 of the track module 20. A preferred embodiment, as shown in FIG. 1 utilizes a plurality of (preferably two) track modules 20 connected in serial arrangement by steering modules 110. In that embodiment, a separate sensor module 130, housing various sensor apparatuses and components, is received between the steering modules 110. As shown in FIGS. 13 and 14, a steering module 110 preferably comprises a yaw actuator 112 and a pitch actuator 114 that are operably interconnected together. More specifically, the yaw actuator 112 is attached to the frame 132 of the sensor module 130 by an output brace 113 and is arranged to selectively provide pivotal motion about a yaw axis "C—C". Rigidly attached to the rotary output collar 115 of the yaw actuator 112 is the rotary output collar 116 of the pitch actuator 114. The pitch actuator 114 is similarly attached to the housing of the track module 20 by an output brace 117. In a preferred embodiment, the yaw actuator 112 and the pitch actuator 114 are substantially identical in construction. Accordingly, the preferred construction of the yaw actuator 112 will be herein described with it being understood that the pitch actuator 114 is preferably constructed in a similar manner.

The yaw actuator 112, as shown in FIG. 14, preferably comprises a motor stator 118 and a rotor 120 arranged and rotatably supported on a collection of bearings 121 housed within an input housing 122 that is rotatably affixed to the output brace 113. Attached to the rotor 120 is an input shaft 124 that has an input gear 126 affixed thereto. Input gear 126 is arranged in meshing engagement with rotary output collar 115 which is rigidly affixed to the output brace 113. The skilled artisan will understand that by supplying electrical current to the stator 118 rotational movement of the rotor 120 and, ultimately, the output collar 115 and brace 113 can be achieved. Thus, by selectively powering the yaw actuator 112 and pitch actuator 114, the track module 20 can be made to rotate around yaw axis "C—C" and a pitch axis "D—D" to permit the vehicle 10 to assume a variety of different configurations as will be discussed in further detail below. The skilled artisan will also appreciate that a myriad of other known pitch/yaw actuator arrangements may be used without departing from the spirit and scope of the present invention.

As was briefly discussed above, in this embodiment, the vehicle 10 is provided with a sensor module 130 that can carry a variety of different sensing and operational components. In particular, the sensor module 130 comprises a frame member 132 that is preferably removably attached to the output braces 113 and 117 of the steering modules 110 as illustrated in FIG. 1. Attached to the frame 132 is a preferably fluid-tight housing member 134 configured as shown in FIG. 1. Although the housing 134 may be used to house a variety of different components, we prefer to include therein an ultrasonic inspection sensor for ultrasonically inspecting and analyzing the thickness and integrity of the surface upon which the vehicle 10 is traveling. It will be appreciated that a variety of commercially available ultrasonic sensors/transducer systems may be successfully used. For example, the OPTIMA ultrasonic/transducer systems manufactured by NDT Instruments of 15751 Graham Street, Huntington Beach, Calif. 92649 or the P-SCAN ultrasonic corrosion mapping system, manufactured by Force Institute and distributed by Swain Distribution, Inc. of No. 2 Research Drive, P.O. Box 99, Searcy, Ariz. 72143 are well-adapted for this application. The skilled artisan will also readily appreciate that the output signals from the ultrasonic sensors can be analyzed and manipulated by known methods and computer software packages to develop contour models and displays of the portion of the vessel wall being analyzed. The information received from such analysis can be used in known statistical models for predicting when a particular wall cross section may fail. Such information is invaluable in performing preventative maintenance tasks to prevent the future rupture of deteriorating tank wall sections.

To assist with steering the vehicle 10 within an enclosed area or vessel where human access is prohibited, known acoustical navigation systems, represented by transponder 140 are preferably used. For example, the SHARPS acoustic positioning system manufactured by the Marquest Group of 8 Otis Park Drive, Bourne, Mass. 02532 is well adapted for this purpose. It will be appreciated by those of ordinary skill in the art that, through known methods, the location of the vehicle 10 can be constantly ascertained and communicated to the operating personnel located outside of the enclosed area or vessel to ensure that every portion of the vessel wall is ultrasonically analyzed.

Also in a preferred embodiment, one of the track modules 20 is preferably equipped with a camera 150 to transmit a video picture to the personnel located outside of the vessel. For example, the camera/video systems manufactured by Benthos Inc. of 49 Edgerton Drive, North Falmouth Mass. 02556-2826 or the video systems manufactured by Crestone Products, Inc. of 4175 W. Quail Ridge Dr., Boise, Id. 83703 are well adapted for this purpose.

In addition to the above-mentioned components, the skilled artisan will appreciate that a variety of other sensors and apparatuses may be attached to and deployed with the vehicle 10. For example, depending upon the type of environment in which the vehicle 10 will be operating, the sensor module may contain vapor sensors, radiation detectors and other sampling and detection devices. It will be further appreciated that the vehicle 10 may be equipped with high or low pressure spraying apparatuses for cleaning purposes. Also, the present vehicle may be equipped with a variety of known material handling apparatuses such as manipulators, plows, etc. that are sized to permit entry through a constrained opening such as a pipe riser or manway.

Figure 15:
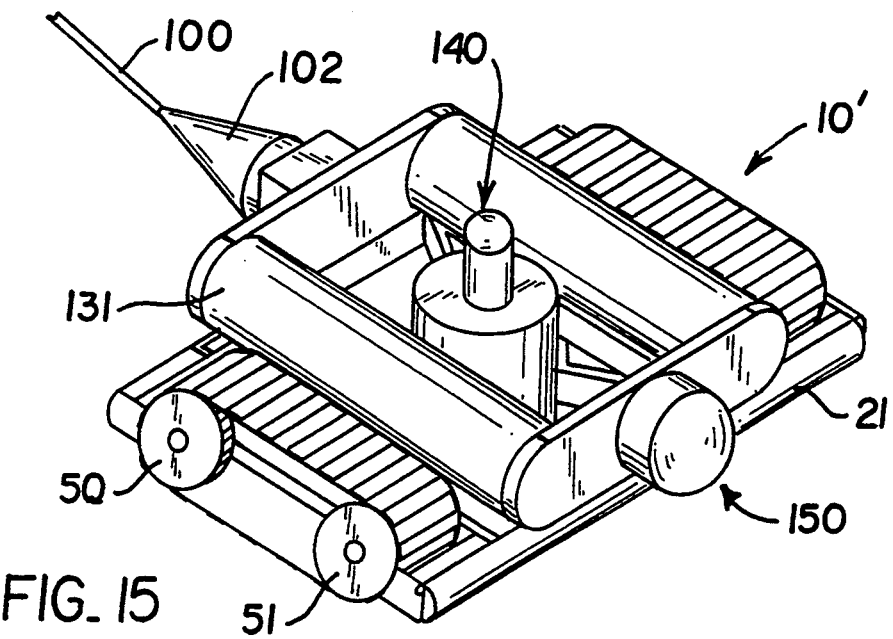
FIG. 15 is a perspective view of another vehicle configuration of the present invention.

In another embodiment, as shown in FIG. 15, the vehicle 10' has a frame member 21 and two track modules 20 attached thereto in a parallel configuration. In that embodiment, the above-mentioned sensing and control components are housed in lateral housing members 131. In addition, the acoustic navigational transponder 140 is situated in the center of the vehicle 10'. Control power is supplied to the vehicle by the tether 100 that is connected thereto by tether termination member 102. The video camera system 150 is also attached to the vehicle 10 as shown in FIG. 15. The reader will appreciate that this embodiment is suited for entry into vessels that have somewhat larger access points such as, for example, aboveground storage tanks. Preferably, the above described track modules 20 and steering modules 110 are removably interconnected such that they may be quickly and easily assembled in a serial arrangement (FIG. 1) or they may be attached in a parallel arrangement (FIG. 15) by using simple hand tools.

As was mentioned above, control power is supplied to the vehicle (10, 10') through tether 100. It will be appreciated that the output lines from the above mentioned components are also housed in the tether 100. In addition to supplying the control power to the vehicle (10, 10'), the tether 100 provides a means whereby the vehicle (10, 10') can be deployed into and retrieved from an enclosed vessel. Such tether lines are known in the art and the tether lines such as the ones manufactured by BIW Cable Systems, Inc. of 22 Joseph E. Warner Blvd. No. Dighton, Mass. 02764 are well suited for this application. In addition, a tether line management system, generally designated as 170, such as one of the systems manufactured by Dynacon, Inc., 831 Industrial Blvd., Bryan, Tex. 77803 is particularly suited for controlling the deployment and retrieval of the tether line 100 from an enclosed vessel.

Figure 16:
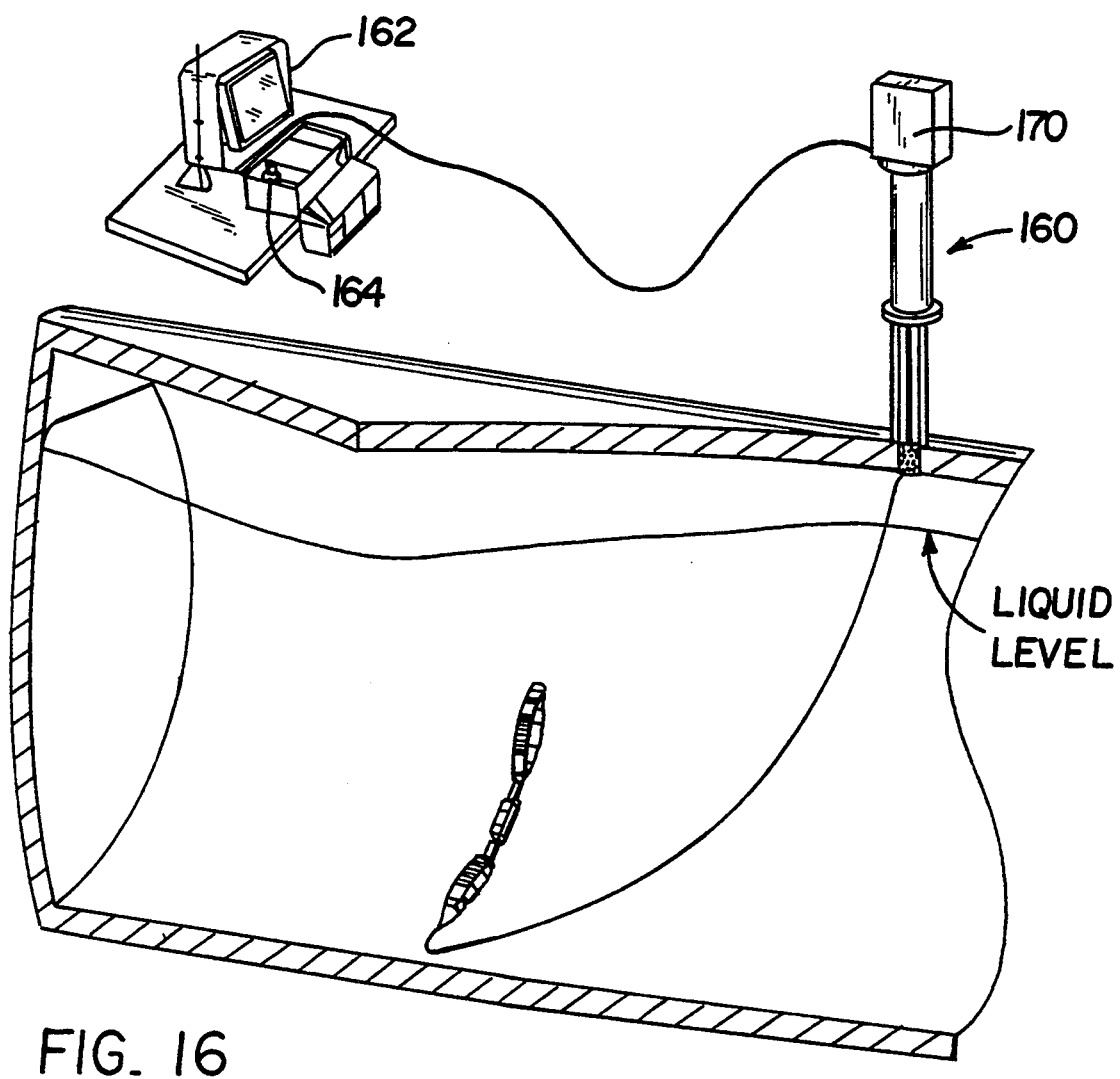
FIG. 16 is a partial cross-sectional perspective view of the vehicle of FIG. 1 deployed in a vessel containing a liquid.

The tether line management system 170 can be externally mounted on a deployment pod 160 (See FIG. 16) or preferably is housed within a deployment pod 160. The deployment pod 160 is preferably designed to achieve an airtight seal around the vessel's entry point to prevent fumes, vapors, etc. from escaping into the atmosphere. A deployment pod equipped and having the capabilities of the deployment pod disclosed in U.S. patent application Ser. No. 08/041,563, the disclosure of which is hereby incorporated by reference, is preferably used to control the deployment, retrieval, decontamination and storage of the vehicle 10.

In a preferred embodiment, the vehicle (10, 10') is controlled from a control console 162 that contains the controls and monitors for the various components attached to the vehicle 10. The preferred method of operation for controlling the driving of the track modules 20 comprises a known joy stick control system, generally designated as 164, such as one of the joy stick control systems manufactured by RedZone Robotics, Inc. of 2425 Liberty Avenue, Pittsburgh, Pa. 15222-4639. As illustrated in. FIGS. 16–19, the vehicle 10 can assume a variety of configurations by magnetically engaging one track module 20 with the vessel surface and manipulating the other track module 20, by means of the appropriate steering assembly 110 to cause it to be pivoted about the yaw axis "C—C" and/or pitch axis "D—D" thereof to cause that track module 20 to assume the desired orientation. That track module 20 can then be caused to magnetically engage the vessel surface and the vehicle 10 can then be driven thereon in that configuration. It will be readily appreciated that, by magnetically engaging one or both track modules 20 with the vessel surface in various sequences, a variety of different vehicle configurations such as those illustrated in FIGS. 16–19 can be achieved. The skilled artisan will also appreciate that the configurations illustrated in FIGS. 16–19 are just a few of the myriad of different configurations that the vehicle 10 can assume and, as such, those Figures should not be construed as depicting the universe of vehicle configurations attainable by the present invention. With respect to the vehicle 10' as shown in FIG. 15, it will be understood that the vehicle 10' is controlled and steered by the joy stick assembly in much the same manner as are known parallel tracked vehicles. However, either or both of the track modules 20 may be selectively caused to magnetically engage or disengage the vessel surface as desired to assist with steering the vehicle 10' or to enable it to traverse along vertical or suspended surfaces.

The reader will also appreciate that the vehicle (10, 10') is particularly well adapted for deployment into vessels containing a variety of different liquids. See FIG. 16. In those applications, however, the skilled artisan will appreciate that the operational components and control wiring must be properly sealed to avoid exposure to the liquid. In those applications wherein the liquid is combustible, all electrical connections are explosion proof in accordance with the various state and federal regulations governing such applications. In addition, the skilled artisan will readily appreciate that the construction of the present invention lends itself well to quick disassembly and reassembly in a desired configuration. For example, the track modules 20 can be easily disassembled from the steering assemblies 110 and reattached to a vehicle frame component such that the track modules 20 are arranged in the parallel configuration as illustrated in FIG. 15. Similarly, the sensor module 130 may be quickly detached from the steering assemblies 110 and another sensor module or module containing material handling or manipulation devices may be reattached.

From the above-description, the reader will appreciate that the present invention is well-suited for conducting a variety of operations in a variety of different environments. For example, the vehicle (10, 10') may be configured for entry into an enclosed vessel though a manway or standpipe therein. The vehicle can be safely operated in a vessel containing hazardous material by personnel located outside of the vessel. The magnetic tracks of the vehicle permit the vehicle to traverse the vertical walls and ceiling of the vessel as desired. Such operational flexibility permits the vehicle's scanning and sensing apparatuses to be driven upon every portion of the vessel structure so that the vessel's structural integrity may be analyzed. The vehicle is also equipped with navigational apparatus to assist the personnel located outside of the vessel in determining the vehicle's exact location within the vessel.

While the vehicle of the present invention is particularly well adapted for use in enclosed vessels such as storage tanks and the like, the present invention's utility is not limited to those applications. For example, the vehicle 10 of the present invention can be used to analyze the structural integrity of a pipeline or to perform other tasks therein. In any event, the present invention provides solutions to the aforementioned problems associated with prior known methods and apparatuses used to evaluate the structural integrity of an enclosed vessel having constrained access points. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A vehicle for use in a vessel having walls with interior surfaces capable of supporting a magnetic circuit, comprising:
   a frame member;
   an endless driven member received on said frame member and adapted for travel on the interior surfaces of the vessel walls;
   means for driving said endless driven member;
   a magnetic system attached to said frame member and comprising a magnet, fixed magnetic circuit means, and movable magnetic circuit means for establishing first and second magnetic circuits; and
   means for selectively connecting said movable magnetic circuit means to said means for driving to move said movable magnetic circuit means between a first position wherein said first magnetic circuit is established between said endless driven member, said magnet, said fixed magnetic circuit means and said movable magnetic circuit means such that said endless driven member is caused to magnetically engage one of the interior surfaces of the vessel, and a second position wherein said second magnetic circuit is established between said magnet, said fixed magnetic circuit means, and said movable magnetic circuit means such that said endless driven member does not magnetically engage one of the interior surfaces of the vessel.

2. The vehicle of claim 1 wherein said fixed magnetic circuit means includes an upper magnetic circuit piece, a first lower magnetic circuit piece, and a second lower magnetic circuit piece, and wherein said movable magnetic circuit piece includes a shaft having a magnetic and non-magnetic portion, and wherein said movable magnetic circuit means is positioned so as to rotate within said fixed magnetic circuit means.

3. The vehicle of claim 2 wherein said magnet is positioned between said upper magnetic circuit piece and said first lower magnetic circuit piece.

4. The vehicle of claim 3 wherein said means for selectively connecting said movable magnetic circuit means to said means for driving comprises a clutch member.

5. The vehicle of claim 1 wherein said second magnetic circuit prevents said movable magnetic circuit member from being accidentally moved to said first position.

6. The vehicle of claim 1 wherein said endless driven member comprises a plurality of pivotally interconnected cleat members.

7. The vehicle of claim 1 further comprising an ultrasonic sensing system attached to said frame member for ultrasonically analyzing the integrity of the walls of the vessel upon which said vehicle is driven.

8. The vehicle of claim 1 further comprising a video camera system attached to said frame of said vehicle.

9. The vehicle of claim 1 wherein said means for driving and said means for selectively connecting are controlled by control means located outside of the vessel.

10. The vehicle of claim 1 further comprising a tether means attached to said frame, said tether means supplying power to said vehicle from a remote power source and providing a mechanism whereby said vehicle may be deployed and retrieved by a vehicle retrieval means located outside of the vessel.

11. The vehicle of claim 1 further comprising means for pinpointing the location of said vehicle within the vessel such that the vehicle can be tracked and monitored by personnel located outside of the vessel.

12. A remotely configurable vehicle for use in an enclosed vessel having walls with interior surfaces capable of supporting a magnetic circuit comprising:
   a plurality of interconnected drive members, each said drive member having a frame member, an endless driven member received on said frame member and adapted for travel on one of the interior surfaces of the vessel, means for driving said endless driven member attached to said frame member, a magnetic system attached to said frame member and comprising a magnet, a fixed magnetic circuit means, and movable magnetic circuit means for establishing first and second magnetic circuits, and means for selectively connecting said movable magnetic circuit means between a first position wherein said first magnetic circuit is established between said endless driven member, said magnet, said fixed magnetic circuit means, and said movable magnetic circuit means such that said endless driven member is caused to magnetically engage one of the interior surfaces of the vessel, and a second position wherein said second magnetic circuit is established between said magnet, said fixed magnetic circuit means and said movable magnetic circuit means such that said endless driven member does not magnetically engage one of the interior surfaces of the vessel; and
   a sensor carrying member interconnected to at least one said drive member.

13. The remotely configurable vehicle of claim 12 wherein said sensor carrying member is interconnected to at least one said drive member by a steering module adapted to selectively articulate said sensor carrying module with respect to said drive members attached thereto about a pitch axis and a yaw axis.

14. The remotely configurable vehicle of claim 13 wherein a first drive member is interconnected to a first end of said sensor carrying member by a first steering module and wherein a second drive member is interconnected to a second end of said sensor carrying member by a second steering module such that said vehicle can be configured and driven in a plurality of configurations by selectively operating said first and said second steering modules in predetermined sequences.

15. A remotely configurable vehicle for use in an enclosed vessel having walls with interior surfaces capable of supporting a magnetic circuit comprising:
   a plurality of interconnected drive members, each said drive member having a frame member, an endless driven member received on said frame member, said endless driven member including a plurality of pivotally interconnected cleat members each having an electro-magnet formed thereon, means for driving said endless driven member attached to said frame member, and electrical contact means carried by said frame member for selectively providing electrical power to said electro-magnets of said endless member to enable said endless member to selectively magnetically engage one of the interior surfaces of the vessel walls for travel thereon; and
   a sensor carrying member interconnected to at least one said drive member.

16. The remotely configurable vehicle of claim 15 wherein said sensor carrying member is interconnected to at least one said drive member by a steering module adapted to selectively articulate said sensor carrying module with respect to said drive members attached thereto about a pitch axis and a yaw axis.

17. The remotely configurable vehicle of claim 16 wherein a first drive member is interconnected to a first end of said sensor carrying member by a first steering module and wherein a second drive member is interconnected to a second end of said sensor carrying member by a second steering module such that said vehicle can be configured and driven in a plurality of configurations by selectively operating said first and said second steering modules in predetermined sequences.

18. A mobile vehicle for use in an enclosed vessel having walls with interior surfaces capable of supporting a magnetic circuit comprising:
   a frame member;
   at least two drive members, each said drive member having a housing connected to said frame member such that said drive members are parallel to one another, each said drive member further having an endless driven member received on said housing and adapted for travel on one of the interior surfaces of one of the vessel walls and means for driving the endless driven member and a magnetic system attached to said housing comprising a magnet, fixed magnetic circuit means, and movable magnetic circuit means for establishing first and second magnetic circuits, and means for selectively connecting said movable magnetic circuit means to said means for driving to move said movable magnetic circuit means between a first position wherein said first magnetic circuit is established between said endless driven member, said magnet, said fixed magnetic circuit means and said movable magnetic circuit means such that said endless driven member is caused to magnetically engage one of the interior surfaces of the vessel, and a second position wherein said second magnetic circuit is established between said magnet, said fixed magnetic circuit means and said movable magnetic circuit means such that said endless driven member does not magnetically engage one of the interior surfaces of the vessel; and
   a sensor carrying member attached to said frame member.

19. A method for performing tasks within a vessel having walls with interior surfaces capable of supporting a magnetic circuit comprising the steps of:
   providing a mobile vehicle having at least one drive member, said drive member having a frame member, an endless driven member received on said frame member and adapted for travel on the interior surfaces of the vessel walls, means for driving said endless driven member, a magnetic system attached to said frame member and comprising a magnet, fixed magnetic circuit means, and movable magnetic circuit means for establishing first and second magnetic circuits, and means for selectively connecting said movable magnetic circuit means to said means for driving to move said movable magnetic circuit means between a first position wherein said first magnetic circuit is established between said endless driven member, said magnet, said fixed magnetic circuit means, and said movable magnetic circuit means such that said endless driven member is caused to magnetically engage one of the interior surfaces of the vessel, and a second position wherein said second magnetic circuit is established between said magnet, said fixed magnetic circuit means, and said movable magnetic circuit means such that said endless driven member does not magnetically engage one of the interior surfaces of the vessel;
   deploying said vehicle into said vessel by a vehicle deploying means;
   connecting said movable magnetic circuit means to said means for driving to move said movable magnetic circuit means to said first position to cause said endless driven member to magnetically engage one of the interior surfaces of the vessel; and
   moving said vehicle along the interior surface by driving said endless driven member with said means for driving said endless driven member.

20. The method of claim 19 wherein said vehicle deploying means comprises a pod member located outside of the vessel and communicating with an opening therein to create an airtight seal therebetween, said pod member including decontamination and storage means for decontaminating said vehicle and storing said vehicle therein when said vehicle has been retrieved from said vessel.

21. The method of claim 20 wherein said vehicle deploying means further comprising vehicle maintenance means attached to said pod member for permitting personnel located outside of said pod member to perform maintenance tasks on said vehicle when said vehicle is stored within said pod member means.

* * * * *